Jan. 1, 1963 H. C. HARBERS ETAL Re. 25,315

DUMP TRUCK

Original Filed July 23, 1954 2 Sheets-Sheet 1

HENRY C. HARBERS
DONALD R. MERCHANT
INVENTORS.

BY
ATTORNEY

DUMP TRUCK

Original Filed July 23, 1954 2 Sheets-Sheet 2

HENRY C. HARBERS
DONALD R. MERCHANT
INVENTORS.

BY

ATTORNEY

United States Patent Office

Re. 25,315
Reissued Jan. 1, 1963

25,315
DUMP TRUCK

Henry C. Harbers, Pasadena, and Donald R. Merchant, Glendale, Calif., assignors, by mesne assignments, to Challenge-Cook Bros., Incorporated, La Mirada, Calif., a corporation of California Original No. 2,794,673, dated June 4, 1957, Ser. No. 445,296, July 23, 1954. Application for reissue June 2, 1959, Ser. No. 817,699
6 Claims. (Cl. 298—22)

Matter enclosed in heavy brackets [ ] appears in the original patent but forms no part of this reissue specification; matter printed in italics indicates the additions made by reissue.

Our invention relates to dump trucks of the type embodying front and rear wheel assemblies, normally supporting a dump body in load-carrying position thereon, the body of the truck being separate from the front wheel assembly and mounted on the rear wheel assembly for upward and rearward swinging movement to dumping position, and a hoisting mechanism operable to swing the dump body to dumping position by effecting relative approaching movement of the wheel assemblies.

Those body hoisting mechanisms with which we are familiar comprise a block and tackle unit connected between the wheel [asesmblies] *assemblies,* and an actuating windlass for the unit. Such mechanisms possess many mechanical disadvantages in addition to being costly, difficult of installation, and requiring frequent repair and replacement of parts, particularly the cables thereof which are subject to wear and breakage. Moreover, such mechanisms not only render the dump truck unstable to the extent that when dumping a load the truck is subject to overturning, but they are inadequate to hoist large capacity dump bodies when carrying heavy loads.

It is a purpose of our invention to provide in a dump truck of the character described, a simple, inexpensive and readily installable body hoisting mechanism which is hydraulically operated and so associated with the truck as to greatly increase its stability, and which provides adequate power to hoist and dump truck bodies of large capacity and carrying extremely heavy loads.

It is also a purpose of our invention to provide a hoisting mechanism which embodies draft links connected between the front wheel assembly and the dump body, and one or more hydraulic jacks connected between the draft links and the dump body for operating the links to effect relative approaching movement of the wheel assemblies resulting in swinging of the dump body to dumping position.

A further purpose of our invention is the provision of a body hoisting mechanism in which one or more supplemental hydraulic jacks are associated with the draft links and the dump body to assist those hydraulic jacks connected between the front wheel assembly and the dump body, in hoisting the body to dumping position, and which is particularly effective to hoist bodies of large capacity and carrying extremely heavy loads.

We will describe only one form of dump truck embodying one form of body hoisting mechanism embodying our invention, and will then point out the novel features thereof in claims.

Figures 1, 4:
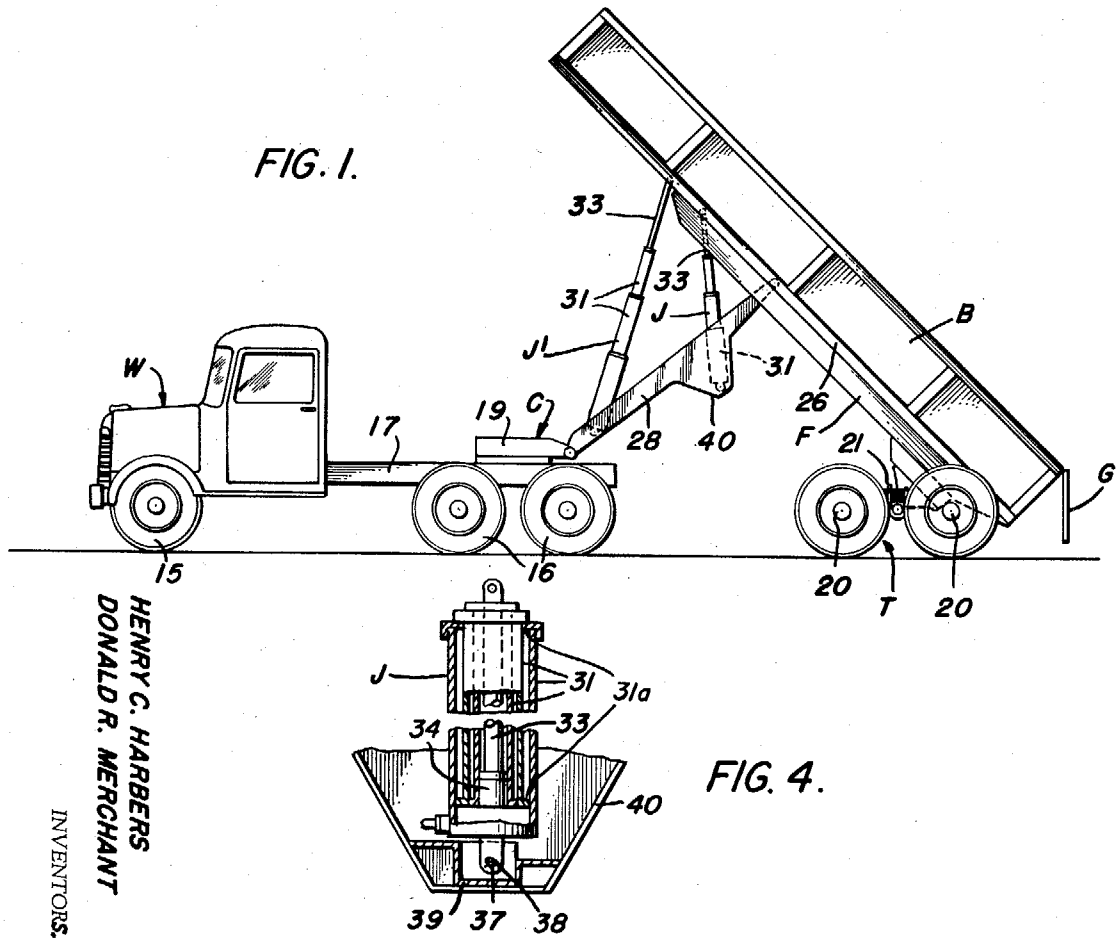
FIG. 1 is a view showing in side elevation the dump truck in dumping position and having incorporated therein one form of hoisting mechanism embodying our invention.
FIG. 4 is an enlarged vertical sectional view taken on the line 4—4 of FIG. 3.

Referring more particularly to the drawings, the dump truck consists in the main of a wheeled truck *or automotive tractor,* generally designated at W, which is self-powered and of the type commonly used in connection with semi-trailers, *and a load-carrying trailer*; a trailing or rear [whel] *wheel* assembly *or ground-contacting supporting members* T; a frame F pivoted on the assembly T; and a *load-carrying member or* dump body B fixed to the frame F, and having its rear end provided with a pivoted gate G.

The vehicle *or automotive tractor* W includes front wheels 15 and tandem axle rear wheels 16 which constitute the front wheel assembly of the dump truck as a whole, all of the wheels supporting a rigid frame including parallel side beams 17. Fixed on the side beams 17 above the wheels 16 is a lower member *or trailer attachment means* 17a of a conventional form of fifth wheel C, and rotatable on this member is an upper *fifth wheel or foot or connector* member 17b to which is secured a plate 19a fixed to a frame including parallel side beams 19 spanned by cross beams 19b.

The rear wheel assembly T in the present instance is shown as a tandem axle assembly, the two axles 20 of which support the ends of spring 21, with the springs carrying depending bearings 22 in which trunnions 23 are mounted. These trunnions, in turn, are fixed to members 24 depending from a cross frame 25.

The frame F includes parallel side beams 26 connected together at longitudinally spaced points by cross beams 27, and to which cross beams the dump body B is fixed. The rear ends of the beams 26 are fixed to the cross frame 25, and thus through the medium of the trunnions 23 the frame F and the included body B are mounted on the rear wheel assembly T for upward and rearward swinging movement to dumping position about the trunnions 23 as a center.

Figure 2:
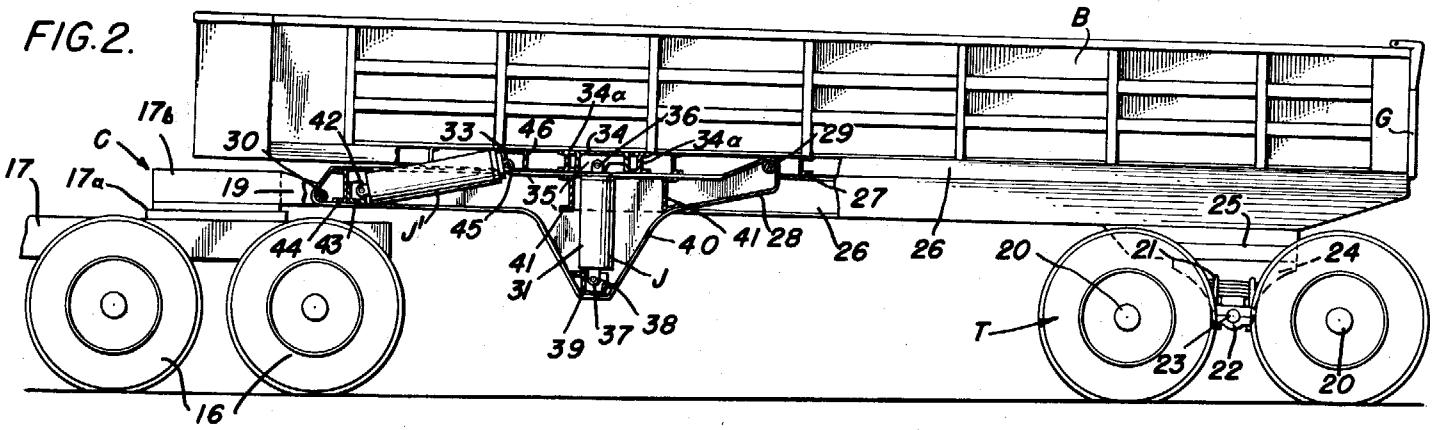
FIG. 2 is an enlarged side elevational view with a part thereof in section on the line 2—2 of FIG. 3.

The mechanism of our invention for hoisting the body B from the lowered position shown in FIG. 2 to the elevated position shown in FIG. 1, includes a draft *member* and lifting means designated generally at M which, in the present instance, comprises a pair of heavy duty links *or articulated joint connection members* 28 pivoted at their rear ends on a cross shaft 29 extending between the side beams 26 intermediate the ends of the latter. The forward ends of the links 28 are pivoted on a cross shaft 30 extending between the rear ends of the side beams 19 of the fifth wheel C. This draft means not only provides a draft connection between the vehicle W and the rear wheel assembly T, but also constitutes a part of the body lifting means as will be later described herein.

The hoisting mechanism of our invention also includes one or more primary hydraulic jacks *or fluid pressure piston and cylinder assemblies* J each of which, as shown in FIG. 4, consists of a plurality of cylinders 31 of graduated diameters and telescopically fitted one within the other, and limited in their outward movements relatively by annular shoulders 31a on the confronting ends thereof. In the smallest cylinder 31 of each jack a piston 32 is fitted, and the rod 33 thereof is adapted for pivotal connection to the frame F. For this purpose a channel member 34 is secured between two I-beams 27, and flanges 35 are formed on the member to which ears 36 on the upper ends of the piston rod 33 are pivoted.

The lower cylinders 31 of the jacks J are closed and provided with ears 37 pivotally connected as at 38 to a cross beam 39 secured in the bottom of V-shaped wells 40 or extensions formed on and depending from the links 28. The links 28 are rigidly connected one to the other between their ends by cross beams 41.

While one or more jacks J are capable of hoisting the dump body B to dumping position, particularly when used in association with a dump truck of small tonnage capacity, in adaptation of the mechanism to trucks of large tonnage capacity, we employ one or more supplemental hydraulic jacks *or fluid pressure piston and cylinder assemblies* $J^1$. In the present instance only one of such jacks is shown, and it is longer when extended but of the same construction as are the jacks J. The largest cylinder 31 thereof is pivoted as at 42 on a member 43 fixed to the cross beam 44 spanning the link 28 adjacent the axle 30. The piston rod 33 of this jack is pivoted as at 45 to a cross beam 46 secured to the bottom of the body B. The pivots 42 and 45 are on a line coincident with the major axis of the frame F and the draft means M to locate the jack $J^1$ in a corresponding position and midway between the two jacks J.

Figure 3:
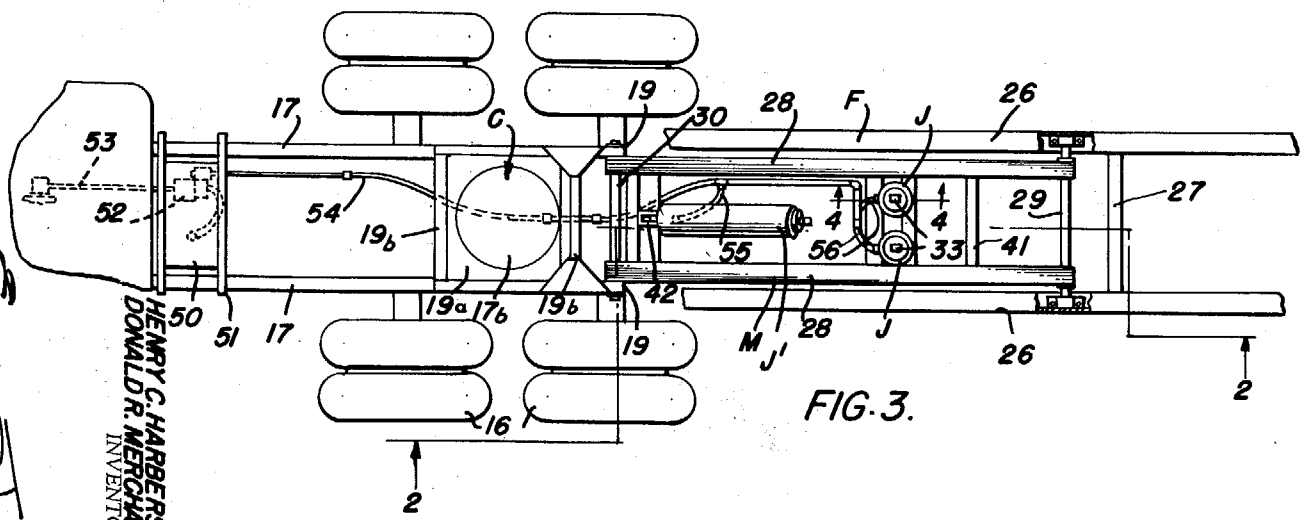
FIG. 3 is a plan view with the beams of the dump body frame broken away at both ends thereof, and the dump body omitted.

For actuating the jacks J and $J^1$ fluid under pressure from a tank 50 carried by cross beams 51 secured to the beams 17 (FIG. 3) is, by a pump 52 driven by a shaft 53 which, in turn, is driven from the vehicle engine in a suitable and manually controlled manner, supplied to the jacks through suitable flexible conduits 54, 55 and 56. These conduits connect the pump 52 to the largest cylinders 31 of the jacks so that the pressure of the fluid supplied to these cylinders will successively pass from one cylinder to the other and in so doing successively project the cylinders from each other and the piston rods from the uppermost cylinders, thereby moving the jacks to the extended positions shown in FIG. 1.

In load carrying position of the dump truck, the body B and the included frame F are substantially horizontal, but they do not rest on the fifth wheel C or any other part of the vehicle V, as illustrated in FIG. 2. The primary jacks J are now collapsed in the wells 40 and in substantially vertical position. The supplemental jack $J^1$ although collapsed assumes a slightly upward inclined position as shown.

To hoist the body B to dumping position, the pump 52 is set into operation thereby delivering fluid under pressure to the jacks J and $J^1$ and causing the cylinders and pistons thereof to be extended as previously described. The primary jacks J first act to exert a vertical lifting force on the body, and since the rear wheel assembly T is separate from the front wheel assembly 16, the two assemblies under such lifting force are caused to approach each other. This allows the body and the links 28 to buckle upward relatively to each other so that under continued elongation of the jacks the body is finally swung upwardly about the trunnions 23 to a dumping position.

In this position the body can be held until complete dumping thereof has been effected, by continued application of pressure fluid to the jacks when, by discontinuing operation of the pump fluid flows back to the tank 50 allowing the jacks to collapse, whereupon the links and body return to normal position. During this operation the wheel assemblies are restored to normal spaced position.

After the [pirmary] *primary* jacks have initiated lifting of the dump body, the supplemental jack $J^1$ becomes operative to assist in lifting the body, and being connected to the body forwardly of the primary jacks, provides that added power necessary to lift dump bodies of large capacities when carrying heavy loads.

It is important to note that the links 28 are connected to the body B about midway of the ends of the latter, and that the jacks J are connected to the body forwardly of the connections of the links therewith and to the extensions 40 positioned to the rear of the longitudinal centers of the links. Also, that the jack $J^1$ is, at one end, connected to the links 28 adjacent their forward ends which is forwardly of the connections of the jacks J to the links, and at the other end it is connected to the body B forwardly of the connections of the jack $J^1$ to the body. Moreover, the jacks J are connected to the links and body equidistantly to opposite sides of the longitudinal center or axis of the body, while the jack J is coincident with such center.

It is by the above arrangement of the jacks with respect to each other and to the links and body, that the jacks when actuated provide the necessary power to successfully hoist a truck body of large capacity and carrying an extremely heavy load. The greatest hoisting power, of course, is produced by the jacks J, and in practice functions to lift the body to about a 30° angle when, because the load now starts to slide from the body to reduce the weight load remaining in the body, permits the jacks J assisted by the jack $J^1$, to complete hoisting of the body to the required angle necessary to effect complete dumping thereof. During the body hoisting operation great transverse stability is given to the truck to prevent overturning thereof, because of the arrangement of the jacks with respect to the major axis of the truck.

Although we have herein shown and described only one form of dump truck embodying our invention, it is to be understood that various changes and modifications may be made herein without departing from the spirit of the invention and the spirit and scope of the appended claims.

What we claim is:

1. A dump truck, including: a front wheel assembly including a fifth wheel, a rear wheel assembly; a body separate from the front wheel assembly and pivoted on the rear wheel assembly for vertical tilting movement from a substantially horizontal load-carrying position to an upwardly inclined load-dumping position; draft means pivoted at its forward end portion on the fifth wheel and pivoted at its rear end on the body; a plurality of hydraulic jacks pivotally connected at one of their ends to said draft means, and pivotally connected at their other ends to the body; and another hydraulic jack pivotally connected at one end to the body forwardly of the connection of the aforementioned jacks on said forward end portion of said body, and pivotally connected at its other end on said forward end portion of said draft means adjacent said pivotal connection of said forward end portion with the fifth wheel.

2. A dump truck, including: a front wheel assembly including a fifth wheel; a rear wheel assembly; a body separate from the front wheel assembly and pivoted on the rear wheel assembly for vertical tilting movement from a substantially horizontal load-carrying position to an upwardly inclined load-dumping position; draft links connecting said fifth wheel to the body; hydraulic jacks connected between the ends of the body and between the ends of the draft links so as to be spaced equidistantly on opposite sides of the major axis of the body, and a third hydraulic jack connected between the body and the draft links forwardly of said pair of jacks and on a line coincident with the major axis of the body; said third jack being pivoted on said draft links adjacent said fifth wheel.

3. A dump truck, including: a body having a rigid frame; a rear axle wheel assembly; means mounting the body and the included frame on said assembly in supported relation and for upward and rearward swinging movement; a front wheel assembly separate from the rear wheel assembly and including a fifth wheel; a pair of draft links pivotally connected between the body frame and the fifth wheel; a pair of main hydraulic jacks pivotally connected at their lower ends in transversely spaced relation to and between the draft links, and pivotally connected at their upper ends at transversely spaced points to the body and equidistantly upon opposite sides of the major axis of the body; and a supplemental hydraulic jack pivotally connected at one end to the body at a point forwardly of and equidistantly between the upper ends of said pair of jacks and pivotally connected at its other end to said links, adjacent said fifth wheel said jacks coacting when operated to actuate the draft links so as to produce relative approaching movement of said wheel assemblies to so swing the body.

4. A dump truck, including: a front wheel assembly; a rear wheel assembly; a body separate from the front wheel assembly and pivoted on the wheel assembly for vertical tilting movement from a substantially horizontal load-carrying position to an upward inclined load-dumping position; draft means connected to the front wheel assembly and to the body substantially midway of its ends; hydraulic means connected to the body forwardly of the connection of the draft means therewith, and to the draft means rearwardly of its longitudinal center to effect upward tilting movement of the body thereby causing operation of the draft means to produce relative approaching movement of the front and rear wheel assemblies thereby moving the dump body to load-dumping position; and a second hydraulic means pivotally connected to the body forwardly of the connection of the draft means with the body, and pivotally connected to the draft means forwardly of the connection of the first-mentioned hydraulic means with the draft means adjacent said front wheel assembly, the second hydraulic means being operable to assist the first-mentioned hydraulic means in lifting the body to dumping position; the pivotal connections of said first and second-named hydraulic means with said body being nearer to one another than the pivotal connection of said hydraulic means with said draft means.

5. A dump truck, including: a body having a rigid frame, a rear axle wheel assembly; means mounting the body and the included frame on said assembly in supported relation and for upward and rearward swinging movement; a front wheel assembly separate from the rear assembly and including a fifth wheel; a pair of draft links pivotally connected between the body frame and the fifth wheel, said links between their ends having depending extensions; a first hydraulic means pivotally connected at one end to the body forwardly of the connection of the draft links with the body, and pivotally connected at the other end to the draft links adjacent said fifth wheel; and a second hydraulic means pivotally connected at one end to and between the lower ends of said extensions, and at its other end to the body between the connection of the first hydraulic means and the draft links with the body.

*6. In combination an automotive tractor and a load-carrying trailer, said trailer including wheels and a load-carrying member, a draft member, means connecting the draft member to the load-carrying trailer and to the tractor, said connecting means including articulated joint members, connecting the load-carrying trailer and the tractor respectively, the point of connection between the draft member and the load-carrying trailer being forward of the wheels of the load-carrying trailer, a fluid pressure piston and cylinder assembly carried solely by the trailer, at a point forward of the point of connection of the draft member thereto and positioned to react upon the tractor substantially at the point of connection of the draft member thereto, and means for supplying pressure fluid to said piston and cylinder assembly to cause it to move in elongation and thereby to raise the forward end of said load-carrying member to tip it, the draft member being effective during the tipping movement to cause the load-carrying member and the tractor to approach each other.*

References Cited in the file of this patent or the original patent

UNITED STATES PATENTS

| | | |
|---|---|---|
| 2,326,594 | Wood | Aug. 10, 1943 |
| 2,350,141 | Wood | May 30, 1944 |
| 2,628,126 | Black | Feb. 10, 1953 |
| 2,661,236 | Schonrock | Dec. 1, 1953 |
| 2,846,267 | Fields | Aug. 5, 1958 |